(12) United States Patent
Beyer et al.

(10) Patent No.: US 7,774,336 B2
(45) Date of Patent: Aug. 10, 2010

(54) ADAPTIVELY REORDERING JOINS DURING QUERY EXECUTION

(75) Inventors: Kevin Scott Beyer, San Jose, CA (US); Latha Sankar Colby, Sunnyvale, CA (US); Quanzhong Li, San Jose, CA (US); Guy Maring Lohman, San Jose, CA (US); Volker Gerhard Markl, San Jose, CA (US); Minglong Shao, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 11/852,784

(22) Filed: Sep. 10, 2007

(65) Prior Publication Data

US 2009/0070313 A1 Mar. 12, 2009

(51) Int. Cl.
*G06F 17/30* (2006.01)
(52) U.S. Cl. ...................................... 707/718; 707/714
(58) Field of Classification Search .................. 707/1–5, 707/10, 100, 103 R
See application file for complete search history.

(56) References Cited

U.S. PATENT DOCUMENTS

| | | | |
|---|---|---|---|
| 5,875,447 A | 2/1999 | Goel et al. | |
| 6,567,802 B1 | 5/2003 | Popa et al. | |
| 6,665,663 B2 | 12/2003 | Lindsay et al. | |
| 6,865,567 B1 | 3/2005 | Oommen et al. | |
| 7,184,998 B2 * | 2/2007 | Nica | 707/2 |
| 7,363,289 B2 * | 4/2008 | Chaudhuri et al. | 707/2 |
| 2005/0060292 A1 | 3/2005 | Day et al. | |

OTHER PUBLICATIONS

Grine, Hocine et al., "Adaptive Query Processing in Mobile Environment," MPAC '05, Nov. 28-Dec. 2, 2005, Article No. 14, ACM 1-59593-268-2/05/11, Grenoble, France.
Ives, Zachary G. et al., "Adapting to Source Properties in Processing Data Integration Queries," SIGMOD 2004, Jun. 13-18, 2004, p. 395, ACM 1-58113-859-8/04/06, Paris, France.
Madden, Samuel et al., "Continuously Adaptive Continuous Queries over Streams," ACM SIGMOND '2002, Jun. 4-6, p. 49, ACM 1-58113-497-5/02/06, Madison, Wisconsin.
Avnur, Ron et al., "Eddies: Continuously Adaptive Query Processing," MOD 2000, p. 261, ACM 2000 1-58113-218-2/00/05, Dallas, Texas.
Srivastava, Utkarsh et al., "Flexible Time Management in Data Stream Systems," PODS 2004 Jun. 14-16, 2004, p. 263, ACM 1-58113-858-X/04/06, Paris, France.

* cited by examiner

*Primary Examiner*—Cam-Linh Nguyen
(74) *Attorney, Agent, or Firm*—Shimokaji & Associates, P.C.

(57) ABSTRACT

A method is disclosed for executing a predetermined query plan, the method comprising: executing a portion of the query plan; providing a reordered query plan; comparing ranking metrics for the query plans; and executing the query plan having the lower ranking metric.

20 Claims, 6 Drawing Sheets

ADAPTIVELY REORDERING JOINS DURING QUERY EXECUTION

BACKGROUND OF THE INVENTION

The present invention relates generally to database management systems. More specifically, the present invention is related to adaptive techniques functioning to dynamically reorder pipeline joins according to data characteristics observed during query execution.

A database management system (DBMS) is typically used for storing, querying, and providing information for various commercial, industrial, technical, scientific and educational applications. As can be appreciated, the volume of information stored in a DBMS increases as a function of the number of users accessing such information by query, and the amount of computing resources required to manage a typical DBMS increases as well.

Figure 1:
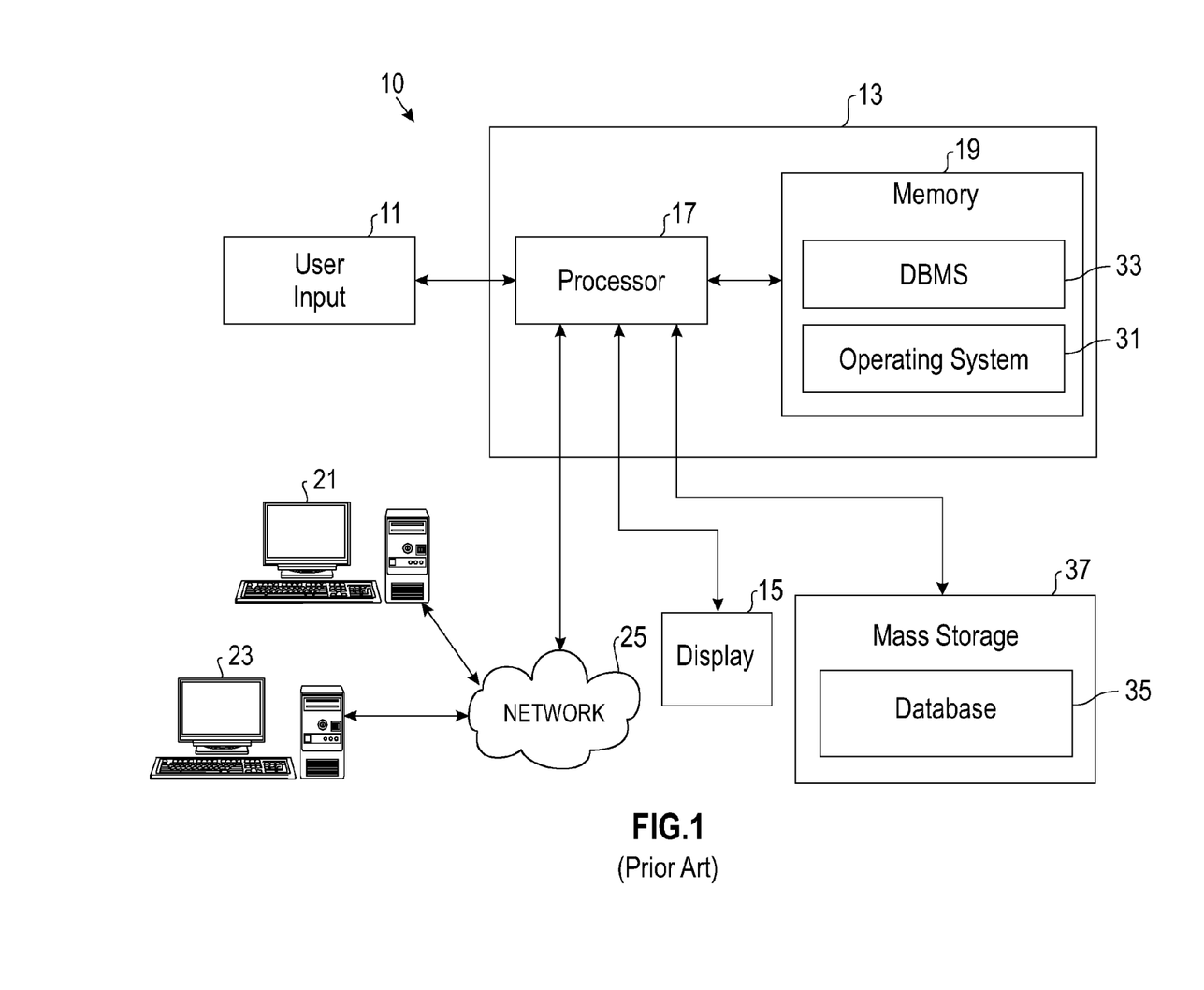
FIG. 1 is a diagrammatical illustration of a conventional data processing system comprising a computer executing a DBMS application with a database located in a database storage device.

FIG. 1 shows a conventional data processing system 10, such as may be embodied in a computer, a computer system, or similar programmable electronic system, and can be a stand-alone device or a distributed system as shown. The data processing system 10 may be responsive to a user input 11 and may comprise at least one computer 13 having a display 15, and a processor 17 in communication with a memory 19. The computer 13 may interface with a second computer 21 and a third computer 23 via a network 25, such as a LAN, a WAN, a wireless network, and the Internet. The computer 13 may operate under the control of an operating system 31, and may execute various computer software applications, such as a DBMS 33 in communication with a database 35 located in a database storage device 37, for example.

The DBMS 33 may use a query optimizer (not shown) to generate an optimal query execution plan during a query compilation phase. Query plan optimization may take into account such factors as platform capabilities and query content information. The query optimizer functions to select the most efficient method of executing each database query inputted to the DBMS 33. The output of an optimization process may be referred to as a query execution plan and may be represented by a query tree. The query execution plan typically provides low-level information for a database engine that includes: (i) operating steps for performing the query, (ii) the order in which the steps are to be executed, and (iii) an estimate of the time required to run the query execution plan. The result of the execution of the database query may be stored as a result set.

In a conventional DBMS, once a query execution plan is generated, the query execution plan typically remains static and unchanged during execution. An optimizer may use a cost-based model to optimize a query plan, where the quality of a query execution plan depends heavily on the cost model and related statistics. However, the statistics may be unreliable or insufficient, since the statistics are approximations of original data, and the statistics may not be accurate or remain up-to-date. Furthermore, there are many situations in which no statistics are available and some defaults or assumptions have to be used, an action that may deteriorate the accuracy of the cost model.

For example, an optimizer may assume uniformity for value distributions, or may assume that column values are independent. Such an assumption can result in incorrect selectivity estimates if the values are, in reality, highly correlated. When the assumptions used by an optimizer are not supported by the underlying data, the resulting errors in estimating the characteristics of the base data can propagate exponentially while estimating the cost of an execution plan. Thus, although an execution plan generated by an optimizer may be the optimal plan based on current statistics and assumptions, the execution plan may be far from optimal for the actual input data set.

The following query example is provided to illustrate some of the problems with static optimization.

| Query A: |
|---|
| SELECT o.name, a.driver |
| FROM Owner o, Car c, Demographics d, Accidents a |
| WHERE    c.ownerid = o.id AND o.id = d.ownerid |
| AND    c.id = a.carid |
| AND    (c.make='Chevrolet' OR c.make='Mercedes') |
| AND    o.country1 = 'Germany' |
| AND    d.salary < 50000; |

The objective of Query A is to examine accidents in Germany for certain makes of cars. Since the query involves only two makes, "Chevrolet" and "Mercedes," a likely query execution plan would have the "Car" table as an outer-most table with an index scan on "make." Because there are relatively few "Chevrolet" cars sold in "Germany," the "Owner" table (with the predicate "country 1='Germany'") has the better filtering power when processing "Chevrolet" cars. Therefore, it appears to be more efficient to place this table before the "Demographics" table in the corresponding query execution pipeline.

In comparison, when scanning "Mercedes" cars, it would be better to have the "Demographics" table before the "Owner" table, since the former would have a better filtering effect than the predicate on "Owner" in the case of luxury cars. In this query, any static or fixed order for the "Demographics" and "Owner" tables would likely be sub-optimal for the entire data set. To achieve the optimal table order, the query execution plan should be monitored and the orders of the tables should be dynamically switched, according to the data being processed. The example of Query A illustrates the need for allowing the run-time system of a DBMS to adaptively process queries according to actual data characteristics.

Applications such as On-Line Transaction Processing (OLTP), Customer Relationship Management (CRM), and certain Web applications requiring low latencies frequently utilize pipelined query execution plans. The preferred and predominant join method used by a typical commercial DBMS for building pipelined query execution plans is a "nested-loop join," which is particularly suited for smaller memory consumption. It is known in the present state of the art, for example, to generate multiple execution plans for a single query as a method of optimizing a query execution plan. This multiple query plan technique may either select the best complete query execution plan at the beginning of execution, or choose from embedded alternative sub-plans in the middle of execution at a materialization point. To deal with the uncertainties of run-time resources and parameter markers in queries, multiple query execution plans may be generated at compile time and, when certain unknowns become known at run time, a decision tree mechanism may select one of the alternate query execution plans.

In a method using adaptive data partitioning (ADP), for example, the source data may be divided into regions to be executed by different but complementary query execution plans, with a final phase that "stitches-up" the results from each partition to derive the complete result. In an alternative optimizer plan-based approach, the optimizer may be called to generate a new plan when inconsistencies are detected. The Progressive query OPtimization (POP) method detects cardinality estimation errors in mid-execution by comparing the optimizer's estimated cardinalities against the actual runtime count of rows at natural materialization points (e.g., sorts) in the plan. If the actual count is outside a pre-determined validity range for that part of the plan, a re-optimization of the current plan is triggered. The DB2 LEarning Optimizer (LEO), in contrast, waits until a plan has finished executing to compare actual row counts to the optimizer's estimates. It learns from mis-estimates by adjusting the statistics to improve the quality of optimizations in future queries. However, LEO does not address how to improve the performance of the current query in mid-execution.

In comparison to optimizer plan-based techniques, row-routing techniques such as the Eddies framework do not require a complex compile-time optimizer. Instead, a run-time optimizer routes each row independently through a sequence of join operators. Since each row may be routed differently, information about which joins have been completed is usually maintained with each row so as to avoid the complexities and overhead associated with a heavy-duty compile-time optimizer. Other techniques used to process stream joins are another form of row routing. For example, query scrambling adapts to data delays from remote data sources by attempting to let other parts of the query progress. "Xjoin" extends the symmetric hash join by allowing parts of the hash tables to be moved to secondary storage. When input rows are unavailable, XJoin uses the rows from secondary storage to continue probing hash tables in memory.

More recently, commonly-assigned U.S. Patent Application 2005/0060292 "Method and System for Dynamic Join Reordering" discloses a database engine and a system running a database engine that utilize a dynamic join reordering feature to change the order of two or more join operations while a query is executing. Change decision is based on fan-out and fan-in rates. In yet another technique, adaptive caching adjusts cache placement and cache maintenance dynamically in a streaming environment. Adaptive ordering of stream filters focuses on adaptively processing data streams. Dynamic plan migration changes join plans dynamically for stream join plans. Most of these stream-processing techniques are based on the symmetric hash join algorithm. Bulk join methods like symmetric hash joins require a huge amount of memory, thus being prohibitive for large scale OLTP systems, where pipelined plans are mandatory and the only low-resource pipelined join method is indexed nested-loop join (or index merge). Supporting indexed nested-loop join is crucial in order to bring adaptation techniques to commercial database systems.

Both plan-based and row-routing schemes suffer from the shortcoming that special techniques are required to deal with the incorrect introduction of duplicates due to run-time changes in the execution strategy. Plan-based re-optimization methods either delay producing results or keep track of the results that have been output. One technique suggested in a variant of POP, for example, saves all row IDs (RIDs) returned to the user by a pipelined plan. The rows produced by any newly re-optimized plan must then be anti-joined with those saved RIDs to eliminate duplicate results. To prevent duplicate results caused by overlapping processing stages in XJoin, Urhan et al. proposed a row-marking algorithm based on timestamps. State Modules (SteMs) also use a similar timestamp technique to prevent duplicates.

From the above, it is clear that there is a need for a method to dynamically reorder a pipelined join plan in mid-execution without having to re-invoke an optimizer to generate new query plans, where the method avoids the introduction of duplicate results caused by join order changes.

SUMMARY OF THE INVENTION

In one aspect of the present invention, a method for executing a query comprises: executing a portion of a predefined query plan, the plan including at least one sequence of pipelined joins; providing a reordered query plan for the sequence of pipelined joins; comparing a ranking metric of the portion of the predetermined query plan with a ranking metric of the reordered query plan; and executing a portion of the reordered query plan if the ranking metric of the reordered query plan is less than the ranking metric of the portion of the predetermined query plan.

In another aspect of the present invention, a method for adaptively modifying a pipelined query plan comprises the steps of: executing a portion of the pipelined query plan; monitoring execution of the portion of the pipelined query plan to obtain an estimated ranking metric of processing table rows; and implementing a query plan reordering to reduce the estimated ranking metric of processing rows in the pipelined query plan.

In yet another aspect of the present invention, an apparatus for executing a predetermined query plan having a sequence of pipelined joins comprises: a database storage device for storing data; a computer program product in a computer useable medium including a computer readable program, wherein the computer readable program when executed on the apparatus causes the apparatus to: execute a portion of the predetermined query plan; estimate a ranking metric for the predetermined query plan and a modified query plan, based upon observed metrics; and adaptively modify the predetermined query plan to the modified query plan when the estimated ranking metric of executing the modified query plan is less than the estimated ranking metric of executing the predetermined query plan.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method for query plan execution via progressive re-optimization or re-execution steps as may be adapted to database servers and application servers using database management systems such as Oracle, Microsoft SQL Server, Sybase, and TeraData, for example. The disclosed method exploits information such as join selectivities that can be monitored during query plan execution to rearrange join operators at run-time and functions to prevent duplicate result tuples from being returned to an application when the join operators are rearranged. Adaptive join reordering is a run-time re-optimization technique that improves both robustness and adaptability of a query processing system by dynamically arranging the join order of pipelined join execution plans according to the observed data characteristics at run-time. Since the adaptation is achieved by changing the pipeline itself, bookkeeping is minimized and routing decisions are not required at the row level, in accordance with an embodiment of the present invention.

The disclosed method includes a technique to dynamically rearrange the join order predefined query plans having a sequence of pipelined joins. This dynamic rearrangement includes the reordering of pipelined joins including, for example, nested-loop joins, block nested-loop joins, and indexed nested-loop joins. The disclosed method thus does not require that an entire query plan comprise a sequence of pipelined joins, but may be applied to any sequence of pipelined joins, whether or not the sequence of pipelined joins includes any non-pipelined sequences. For example, a first contiguous sequence of pipelined joins may be run independently of a second contiguous sequence of pipelined joins, where a non-pipelined sequences may be positioned between the first and second contiguous sequences.

Both inner and outer-most tables can be reordered in response to changing data characteristics measured during execution. In general, the routines executed to implement the embodiments of the invention, whether implemented as part of an operating system such as the data processing system 10 of FIG. 1, or as a specific application, component, program, object, module or sequence of instructions, are herein denoted as a "computer program code," or as a "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention.

Embodiments of the invention can take the form of an entirely hardware embodiment, an entirely software embodiment, or an embodiment containing both hardware and software elements. In a preferred embodiment the invention is implemented in software that includes, but is not limited to: firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, apparatus, or device, or a propagation medium. Examples of a computer-readable medium include: a semiconductor or solid state memory, magnetic tape, a removable computer diskette, a random access memory (RAM), a read-only memory (ROM), a rigid magnetic disk, and an optical disk. Current examples of optical disks include: compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

An adaptive technique functioning to dynamically reorder pipeline joins, or operators, according to data characteristics observed during query execution, in accordance with the present invention, can be described with reference to a flow diagram 40, shown in FIG. 2. The flow diagram 40 can be adapted to operate in a system such as the data processing system 10 shown in FIG. 1. It can be appreciated by one skilled in the art that the configuration shown may be implemented using one or more computer programs under the control of an operating system, such as OS/2™, Windows™, and Unix™, and may be implemented on a single computer, on multiple computers, or in a computer network. Moreover, the present specification may be used to implement the configuration of FIG. 1 as a process, a machine, or an article of manufacture by means of standard programming and engineering methods to produce a corresponding software, firmware, and/or hardware product. More generally, the configuration shown may be tangibly embodied in an article of manufacture, such as computer-readable medium, a data storage device, and/or a data communications device.

Figure 2:
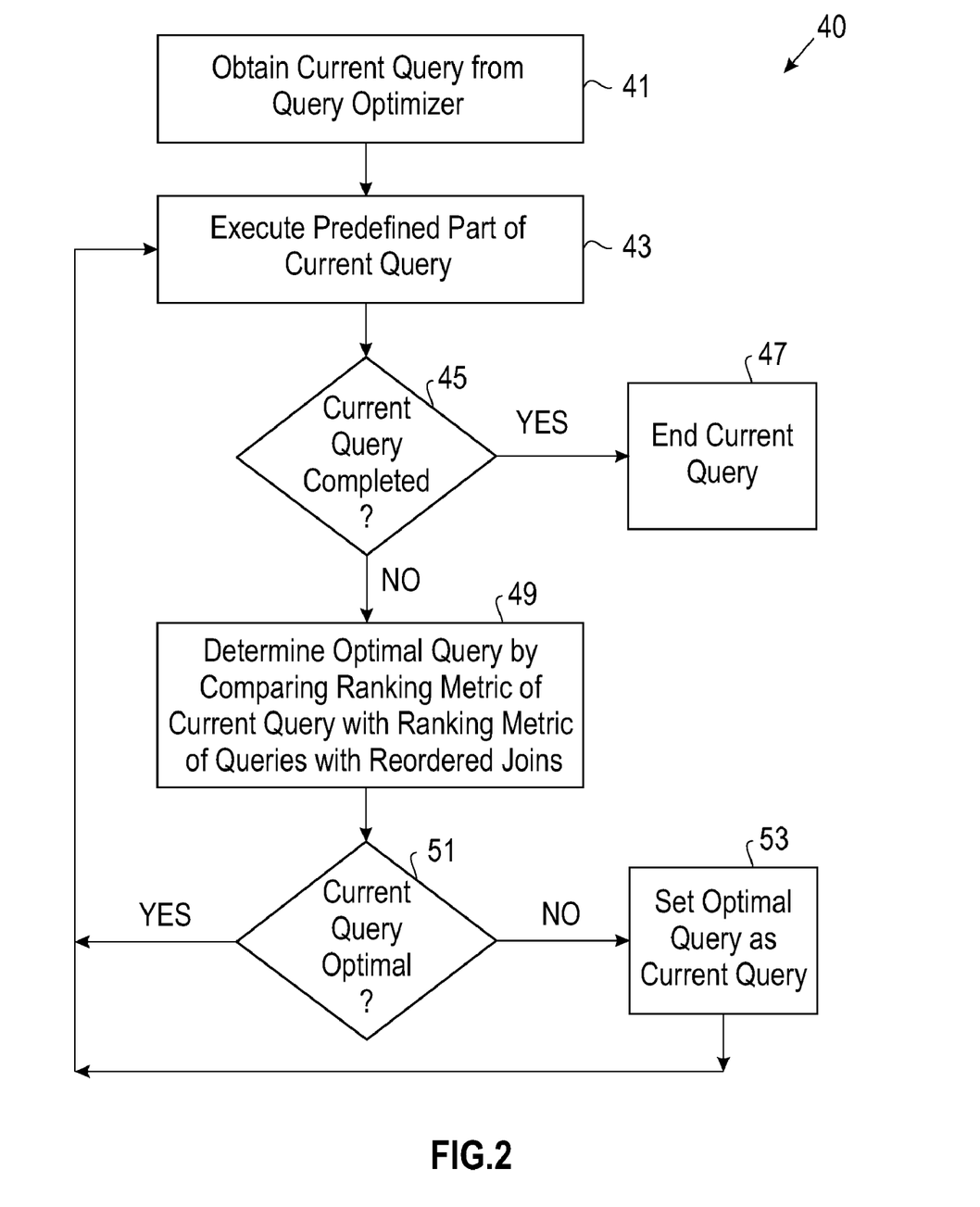
FIG. 2 is a flow chart describing a method used to optimize a query plan by adaptively reordering pipeline joins, in accordance with an embodiment of the present invention.

In FIG. 2, a current query plan may be obtained from a query optimizer, at step 41. The query optimizer may construct a predetermined query plan in response to a user-defined query. A portion of the current query plan may be executed, at step 43, and, if the current query plan has been completed, at decision box 45, the query execution may end, at step 47. In an exemplary embodiment, the portion of the predetermined query plan to be executed may be defined as that portion of the current query plan which is run until either a driving table or an inner table has reached a depleted state.

In an alternative exemplary embodiment, the predefined portion of the current query may be defined as that portion of the current query that is executed A "depleted state" for an inner table may be defined as a state in which: (i) all such matching rows have been processed, (ii) the next outer row has been requested from the outer table, and (iii) the matching process has not begun for the next outer row. A depleted state for a driving table, or an outer table, may be defined as a state in which: (i) all the inner tables in the current pipelined plan have completed the processing of the incoming rows in the inner tables, and (ii) the driving, or outer, table has executed a procedure to prevent the driving table rows already processed from being matched, or output, again.

If the current query plan has not been completed, at decision box 45, a determination may be made as to whether the current query plan is an optimal query plan, at step 49. The optimal query plan determination may be made by comparing a ranking metric of executing the current query plan with ranking metrics of executing one or more other, reordered query plans. As described in greater detail below, the reordered version of the current query plan may comprise a reordering of inner tables in the current query plan, or an exchange of a driving table with an inner table, as described in greater detail below.

If the ranking metric of the current query plan is less than the ranking metric of a reordered version of the current query plan having reordered joins, the current query plan is determined to be optimal, at decision box 51, and query plan execution may return to step 43. Comparing the ranking metrics of the current query plan with a reordered version of the current query play may be done by using observed or estimated information for the current query plan and observed or estimated information for the reordered version of the current query plan. Such information may include, for example, estimates of the number of rows (cardinality) in the tables, the computing cost required to process table rows, and the rate at which table rows are being processed.

At step 43, the next predefined portion of the current query plan may be executed, and operation may proceed to the decision box 45, as described above. If, on the other hand, the ranking metric of a reordered query plan is less than the ranking metric of the current query plan, at decision box 51, the current query plan may no longer be considered optimal. The optimal reordered query plan may be then be set as the current query plan, at step 53, and query execution may return to step 43. At step 43, the next predefined portion of the current query plan may be executed, and operation may proceed to the decision box 45.

Figure 3:
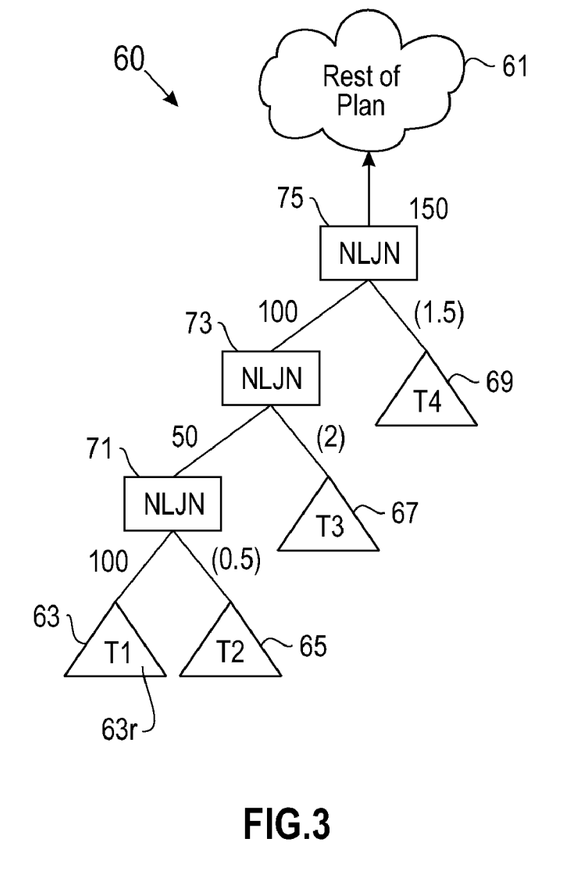
FIG. 3 is a query tree illustrating a procedural plan for a query comprising pipelined joins, in accordance with an embodiment of the present invention.

A procedural plan for a query comprising pipelined joins can be represent by a query tree 60 shown in FIG. 3. As used herein, the term 'pipelined joins' refers to joins that do not amass either most or all of the input or output rows of the tables in a query tree. A pipelined join may thus return some rows to a user or to the next join in a join sequence. The corresponding pipeline may comprise an entire query plan, or may comprise a pipelined portion of a more complex query plan 61. The query tree 60 may comprise a first leg or first table 63 (T1) as an outer-most table or driving table, a second table 65 (T2) as an inner table, a third table 67 (T3) as an inner table, and a fourth table 69 (T4) as an inner table. A database execution engine (run-time) may initiate the query plan by retrieving an outer row 63r from the first table 63. A first join operator 71 functions to provide the values of the join attributes of the outer row 63r to an access operator of the second table 65.

The first join operator 71 may use join predicates to fetch rows that satisfy the predicates local to the second table 65 and the join predicate with values from the first table 63 treated as constants. The qualified rows are used as inputs of a second join operator 73. The processing of the second join operator 73 may be similar to the operation of the first join operator 71, except that the resulting join table (not shown) may comprise a set of matching rows from the previous join executed by the first join operator 71. Likewise, the processing of a third join operator 75 may be similar to the operation of the second join operator 73 in that the resulting join table used by the third join operator 75 may comprise a set of matching rows from the join executed by the second join operator 73.

The pipelined processing thus may comprise a series of operations in which the tables 65, 67, and 69 corresponding to respective join operators 71, 73, and 75 may be probed for each incoming row from the corresponding outer table. Each table 65, 67, and 69 may request another outer row only after the processing of the current outer row has been completed, that is, when all matching rows have been already sent on to succeeding join operators. This is an important property used to minimize the bookkeeping overhead, for the query execution plan and may also serve to distinguish reordering algorithms for inner tables from reordering algorithms for driving tables. A ranking metric for a particular pipelined processing sequence may be specified, for example, by taking the sum of the processing costs of individual joins in the pipeline. The cost of a join operator may be calculated by multiplying the cardinality of its outer table with the cost of the join operation incurred for each row from the respective outer table.

Figure 4:
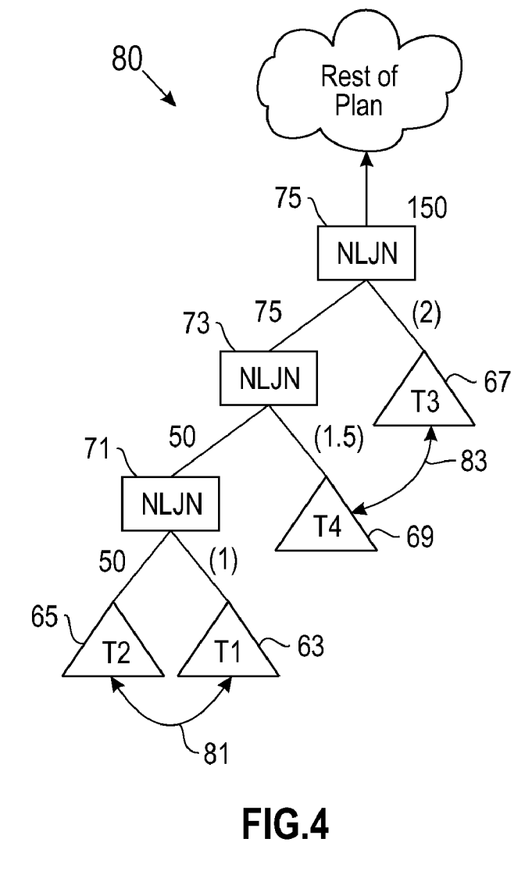
FIG. 4 is a query tree illustrating a reordered version of the procedural plan of FIG. 3, in accordance with an embodiment of the present invention.

Table positions in the query tree have been numbered for clarity of description in FIGS. 3 and 4. The first table 63 has been assigned position 1 (i.e., T1), and thereafter each table has been numbered in increasing order following the pipelined query plan. In FIG. 3, for example, the tables 65, 67, and 69 have been assigned positions 2 (i.e., T2), 3 (i.e., T3), and 4 (i.e., T4) respectively. In FIG. 4, an adaptively join reordered query tree 80 operates with the second table 65 functioning as a driving table. The first table 63 and the second table 65 have been interchanged, as indicated by arrow 81, and the fourth table 69 and the third table 67 have been interchanged, as indicated by arrow 83. Accordingly, the second join operator 73 operates on the fourth table 69 before the third join operator 75 operates on the third table 67, in the reordered query tree 80.

Since the relative positions of the tables in a pipelined query plan may be subject to change during reordering, as shown in FIG. 4, it is convenient to define a mapping function, denoted by "o," for clarity of discussion. This mapping function maps table positions in a query pipeline to table IDs: "o(position)→ID". Accordingly, a join order of tables in a query pipeline may be represented as a table sequence, $T_{o(1)}$, $T_{o(2)}, \ldots, T_{o(k)}$, for a sequence of k tables in the pipeline having respective table IDs from 1 to k. For example, the table sequence in FIG. 4 would be $T_2, T_1, T_4, T_3$.

For a table T, C(T) may be defined as the cardinality of T. Since there may be local predicates on table T, the expression $C_{LEG}(T)$ may be used to represent the cardinality of the leg after applying local predicates. The expression JC(T) may be used to denote the join cardinality of T, where the join cardinality is the number of matching rows per incoming outer row after applying local predicates on an inner table. For clarity of description, the join cardinality of the first table 63, $JC(T_{o(1)})$, is defined to be the leg cardinality of the first table 63, $C_{LEG}(T_{o(1)})$, and $JC(T_{o(0)})$ is defined to be "1." For each incoming row there is a cost to probe the corresponding table, where the expression $PC(T_{o(i)})$ may be used to represent the cost of probing $T_{o(i)}$. Using the above notations, the ranking metric of a pipelined plan for a query Q may be defined as in Equation 1:

$$RankingMetric(\text{Query Plan}(Q)) \equiv \sum_{i=1}^{k} \left[ PC(T_{o(i)}) \prod_{j=0}^{i-1} JC(T_{o(j)}) \right] \quad (2)$$

where $JC(T_{o(0)}))=1$ and $JC(T_{o(1)})=C_{LEG}(T_{o(1)})$. The objective of the process of adaptive join reordering is to dynamically estimate the parameters in Equation (1), and to minimize the ranking metric by optimally reordering the joins.

The numbers enclosed in parentheses in FIG. 2 and FIG. 3 are the join cardinalities of the respective tables, and the numbers not in parentheses represent the number of rows flowing through each join operator, that is, the cardinalities of respective outer tables. In the query tree 60, the second table 65 has a join cardinality of "0.5," the third table 67 has a join cardinality of "2," and the fourth table 69 has a join cardinality of "1.5." In the reordered query tree 80, the first table 63 has a join cardinality of "1," the fourth table 69 has a join cardinality of "1.5," and the third table 67 has a join cardinality of "2." Based on Equation (1), if a probing cost 'p' is the same for each table, the ranking metric for the query tree 60 would be "251 p," and the ranking metric for the reordered query tree 80 would be "176 p."

For Equation (1), if the order of two adjacent tables $T_{o(i)}$ and $T_{o(i+1)}$ is interchanged, the new order is better if and only if the following property is true:

$$\frac{JC(T_{o(i+1)}) - 1}{PC(T_{o(i+1)})} > \frac{JC(T_{o(i)}) - 1}{PC(T_{o(i)})} \quad (2)$$

where the property may be denoted as an adjacent sequence interchange property (ASI). Based on this property, a "processing rate" for each inner table may be defined as:

$$\text{rate}(T_{o(i)}) \equiv \frac{JC(T_{o(i)}) - 1}{PC(T_{o(i)})} \quad (3)$$

To obtain an optimal join plan for a specified driving table, the inner tables may be ordered by their processing rates in ascending order, as for example in Equation 4:

$$\text{rate}(T_{o(2)}) < \text{rate}(T_{o(3)}) < \ldots < \text{rate}(T_{o(k)}) \quad (4)$$

When a driving table has been specified, the processing rates of the inner tables can be compared to determine an optimal join plan that runs with the specified driving table. This procedure is in accordance with the observation that the most selective joins should be processed as early as possible in the query execution sequence so that unwanted data can be discarded as early as possible.

In accordance with pipelined query processing methods, all rows of an inner table matching an incoming outer row may be found and sent to the next inner table. If a table $T_{o(i)}$ is in a depleted state, then it follows that all tables from $T_{o(i+1)}$ to $T_{o(k)}$ will have already finished processing their incoming rows, and these tables will also be in depleted states. That is, the entire segment of the pipeline from $T_{o(i)}$ to $T_{o(k)}$ may thus be a depleted segment. Since there are no outstanding rows or states remaining in a depleted segment, changing the order of tables within the depleted segment does not affect the correctness of join results. On the other hand, if a driving table is in a depleted state, the current pipelined plan should be in a depleted state, allowing the driving tables and inner tables to be reordered without producing incorrect results.

It can be appreciated by one skilled in the art that, unlike row-routing techniques, a change to a query plan may be made to the join orders on the pipeline itself. In accordance with the present invention, if the current query plan is to be reordered, the change to the query plan would not be made unless the pipeline were in a depleted state. The procedural aspect of reordering only in a depleted state advantageously provides for: (i) minimizing the bookkeeping overhead in the query process, (ii) obviating the need for making routing decisions at the row level, and (iii) rendering sufficient opportunities for adapting the join order so as to optimize the query plan.

Table 1 lists an algorithm that can be used to reorder inner tables only when the inner tables are in depleted states, as explained above. This method does not require bookkeeping on individual rows to track the execution status of the inner tables. The parameter of "c" at line 1 is a predetermined value used to control a reordering check frequency. The "c" parameter may be a tunable parameter used to balance the optimality and the run-time overhead, as can be used in step 43 of the flow diagram 40.

TABLE 1

Reorder Inner Tables
REORDER_INNER_TABLE(i) :

1: if $T_{o(i)}$ finishes a batch of c incoming rows from $T_{o(i-1)}$
   then
2:    Calculate ProcessingRate($T_{o(i)}$);
3:    Check the orders of $T_{o(i)}, T_{o(i+1)}, \ldots, T_{o(k)}$;
4:    if the rates are not in increasing order then
5:       Reorder ($T_{o(i)}, T_{o(i+1)}, \ldots, T_{o(k)}$) according to the current rates;
6:    end if
7: end if As the most important table in a pipeline, the driving table determines the running time of the entire pipeline. Because the choice of a particular driving table may affect query performance, it is important to ensure that an optimal driving table is selected. Accordingly, the process of selecting a driving table in a pipeline may be more complex than the process of reordering inner tables. In the example of FIGS. 3-4, the driving table 63 has been exchanged with an inner table, as represented by arrow 81. It is possible that, after the exchange has been made, rows previously-scanned when the table 63 was a driving table may again join with the rows from the table 65 as the new driving table, resulting in duplicate data.

A query processing system may preferably keep track of the execution status of a driving table in order to avoid generating duplicate, re-matched, or re-outputted driving table rows produced as a result of executing the query plan after a table reordering procedure. One such execution tracking method disclosed in the prior art retains the generated results and adds an anti-join at the end of the corresponding pipeline to check for duplicates. However, this anti-join method incurs computational costs to retain the generated results and to perform required anti-joins.

In the method disclosed herein, a local predicate may be added to the driving table to exclude the previously-processed rows if the driving table has been changed. If the table access method on the driving table comprises an index scan, the access of the rows in the driving table may follow two orders. The first order may be the sorted order of scanned index key values that have already been ordered at the time when the index was built. If there is only one value to scan (e.g., for equality predicates), this order can be ignored. The second order may be the record ID order, which is also maintained in increasing order by the index for efficient data access.

If the scan positions of these orders are retained, a local predicate may be used to exclude the accessed rows. For example, if the driving table has been accessed through an index on "age," the original query may contain a local predicate on this index having a value such as "age>30". If the query execution is processing the rows at the predicate "age=35" when the driving table is to be changed, the change may be postponed until the scan on the rows of "age=35" is complete, so that a simple predicate "age>35" is sufficient to filter out the rows already processed. Alternatively, the change can be made immediately and the more complex predicate "age>35 OR (age=35 AND RID>cur_RID)" can be added, where "cur_RID" is the RID of the current row in the "age=35" list.

If the access path of the driving table comprises a table scan, the rows may be accessed in the RID order for efficient sequential input/output. In this case, one local predicate may be used to restrict the RIDs if the driving table is to be changed to an inner table. For example, if the driving table is changed after the row with RID value 100 has been processed, a local predicate "RID>100" can be added to the table to filter out the rows having RIDs less than or equal to 100.

It can be appreciated by one skilled in the relevant art that the positional predicate used above to prevent incorrect data duplication is different from a cursor used to maintain the status of a table scan. When a driving table is switched to an inner table, an index access path may be preferred over a table scan. In such a case, a predicate may be used to prevent incorrect data duplicates from being generated. At the same time, the original cursor may also needed, in the event that a particular inner table is subsequently switched back to a driving table and the original scan needs to be resumed.

By exploiting the access order and applying an additional predicate, it may be possible to switch the driving table with other, inner tables, if desired. One example of an algorithm for reordering a driving table is presented in Table 2. The ranking metric functions disclosed above may be used to evaluate different possible query plans. Step 1 in the reordering driving table algorithm may be used to control the frequency of checking the driving table. Users can decide the value of "c" according to different characteristics of queries and data sets. Step 2 and step 3 require the estimated leg cardinalities and join cardinalities in ranking metric calculations, described below.

TABLE 2

Reorder Driving Table
REORDER_DRIVING_TABLE( ) :

1: if a batch of c rows has been produced by this driving leg
   then
2:   Estimate the ranking metric of the current plan, based
     on what has been observed;
3:   Estimate the ranking metrics of other plans with
     different driving legs;
4:   Pick the best (cheapest) one;
5:   Adjust the join orders according to the new plan;
6:   Add extra local predicates to the old driving leg;
7:   Reset the scan of the new driving leg;
8: end if One objective of dynamic run-time reordering may be to adapt to the data characteristics found while processing the query, and to possibly correct erroneous estimates made by the query optimizer. This requires gathering actual run-time information, such as the incoming and outgoing number of rows resulting from both join predicates and local predicates. By monitoring this run-time information, optimizer estimates may be more accurate and more recent than estimates obtained by using a static optimizer. The ranking metric derived using these run-time statistics also better reflects the characteristics of the data being processed, which enables the query processing to select a better join order. It can be appreciated that run-time monitoring is important for adaptive join reordering.

Figure 5:
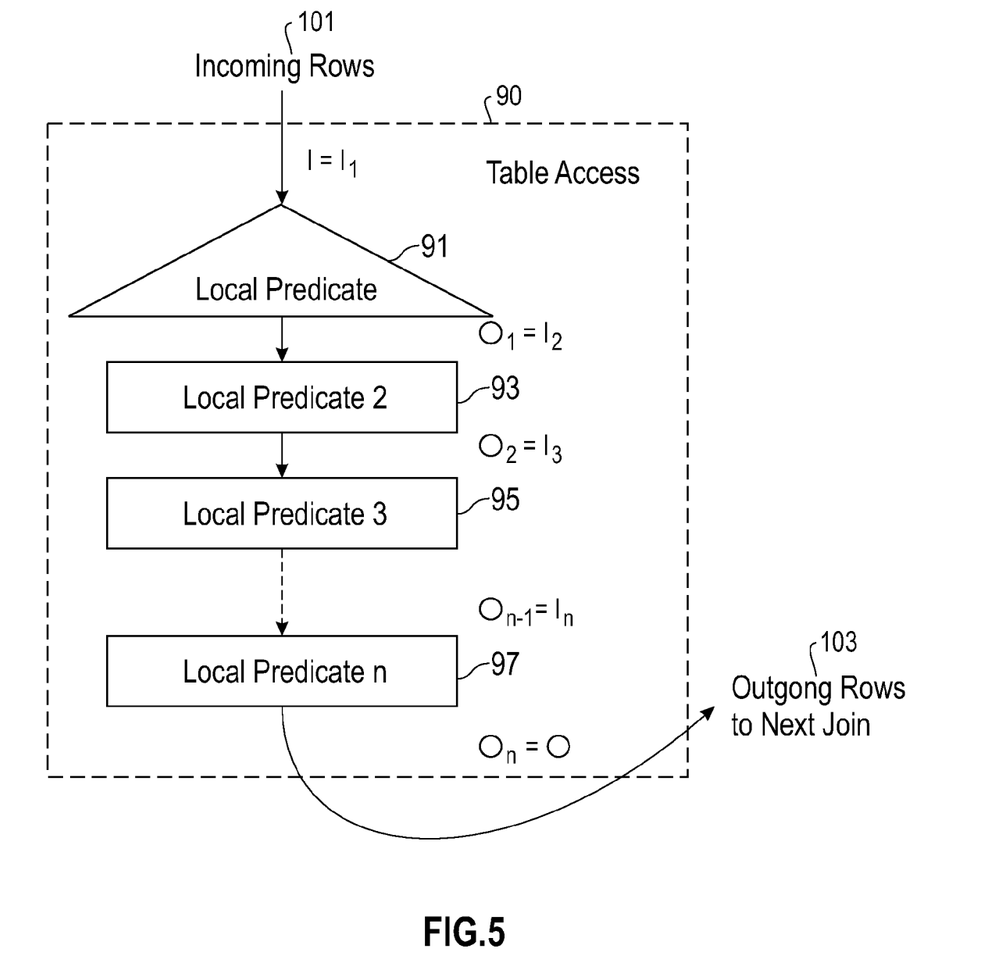
FIG. 5 is a diagrammatical illustration showing the flow of rows through a table having a plurality of local predicates in which a local predicate may be applied by a table access, in accordance with an embodiment of the present invention.

The number of rows processed by local predicates may be monitored at run time. FIG. 5 is a diagrammatical illustration of the flow of rows through a single table T 90 having a plurality of n local predicates 91-97, i.e., $LP_1$ to $LP_n$. For a local predicate $LP_i$, the number of incoming rows 101 may be denoted as $I_i$ and the number of outgoing rows 103 may be denoted as $O_i$. For the entire table T 90, I may be the number of incoming rows from previous tables, and O may be the number of rows output to the next table.

If the table T 90 is the driving table, the value of I may be "1." FIG. 5 illustrates the condition in which a local predicate may be applied by a table access such as, for example, a table scan, a hash scan, and an index scan. If the access path is a table scan, the first local predicate 91 can be ignored. The selectivity of a local predicate used for an index scan, $S_{LPI}$, can be estimated by means of equation 5:

$$S_{LPI} = \frac{O_1}{I_1 * C(T)} \qquad (5)$$

It can be appreciated that the first local predicate may filter the Cartesian product of the incoming rows and the current table, in contrast to filtering only the incoming rows. Accordingly, the effective incoming row count may be denoted as $I_1*C(T)$ for the first local predicate 91, where $C(T)$ is the cardinality of the table T 90. If no local predicate is applied by an index scan, the value of $S_{LPI}$ is just "1." The selectivity of the remaining local predicates 93-97, $S_{LPR}$, can be estimated together as:

$$S_{LPR} = S_{LP2} * S_{LP3} * \ldots * S_{LPn} = \frac{O_n}{I_2} \qquad (6)$$

During query processing, the local predicates $S_{LP2}, \ldots, S_{LPn}$, may be applied together to filter rows and may be treated as one composite predicate. Only the values of $O_n$ and $I_2$ are required to determine the selectivity of the combined local predicates. It can be appreciated that, since the measurement in Equation (6) is the combined selectivity, correlations among local predicates may not affect the accuracy of the estimate.

The selectivity estimation of a join predicate is very similar to the selectivity estimation of a local predicate. If there is only one join predicate, and it is used as the first predicate, then equation 7 may be used to estimate the selectivity $S_{JP}$ of the join predicate:

$$S_{JP} = \frac{O_1}{I_1 * C(T)} \quad (7)$$

Figure 6:
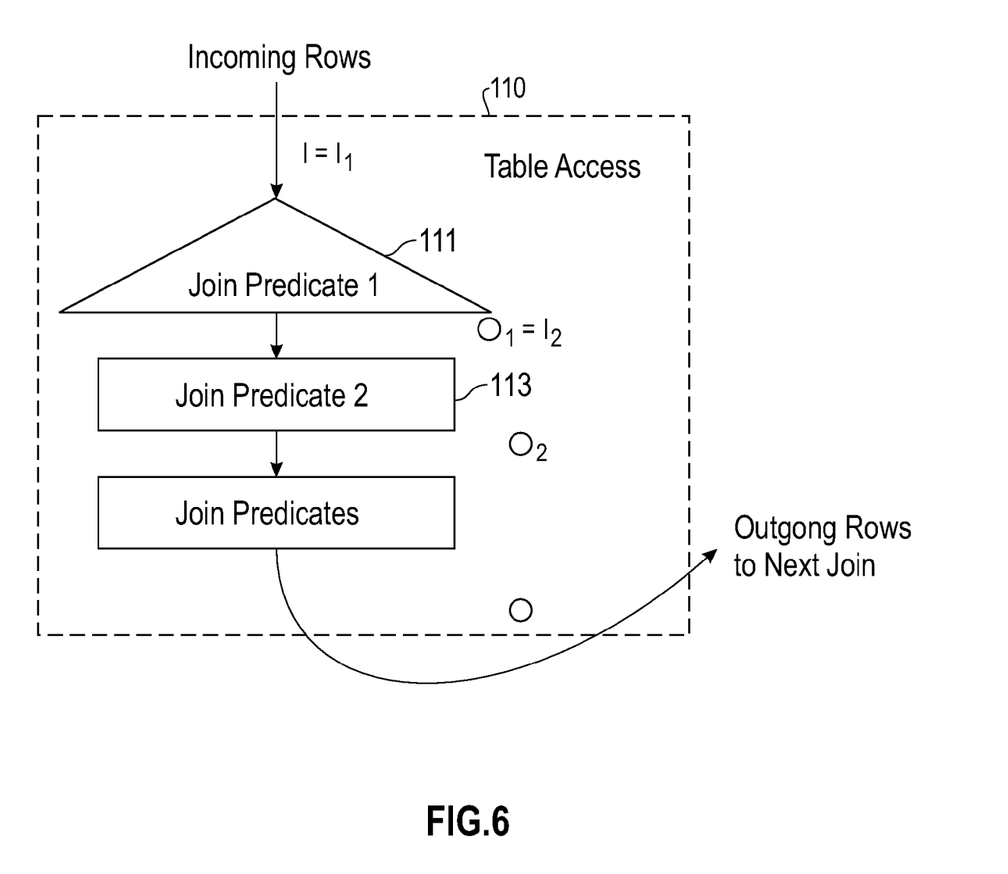
FIG. 6 is a diagrammatical illustration showing the flow of rows through a table having a plurality of join predicates, in accordance with an embodiment of the present invention.

If there is more than one join predicate, as shown in FIG. 6, which is a diagrammatical illustration of the flow of rows through a single table T 110 with two join predicates 111 and 113, the selectivity of the remaining join predicates may be calculated in accordance with equation 8:

$$S_{JP} = \frac{O_2}{I_2} \quad (8)$$

In Equation (8), only counters of incoming and outgoing rows are used, since the remaining join predicates function the same way as local predicates.

It may be necessary to first obtain leg cardinalities in order to calculate the ranking metrics of different candidate join orders. The leg cardinality of a table T can be determined in accordance with equation 9:

$$C_{LEG}(T) = C(T) * S_{LP}(T) = C(T) * S_{LPI}(T) * S_{LPR}(T) \quad (9)$$

where C(T) is the cardinality of the base table; $S_{LP}(T)$ is the selectivity of all local predicates; $S_{LPI}(T)$ is the selectivity of the index predicate(s) if a local predicate is used in the index scan, and $S_{LPR}(T)$ is the selectivity of the remaining local predicates. If there are no local predicates used in an index scan, $S_{LPI}$ is specified to be "1." It is assumed that the base table cardinality can be obtained from a DBMS. This is typically done via statistics collected at insertion time by a database statistics-gathering utility. For the initial driving table, there is only one scan over the index of the initial driving table, and $S_{LPI}(T)$ may not be estimated accurately. In this case, the selectivity estimation may be obtained from the optimizer.

The disclosed method for estimating local selectivities and leg cardinalities can effectively avoid the cardinality estimation errors caused by correlations among columns, as explained using Query B as an example.

| Query B: |
|---|
| SELECT o.Name, c.Year |
| FROM      OWNER o, CAR c, |
| WHERE   c.OwnerID = o.ID AND |
|               c.Make = 'Mazda' AND c.Model = '323' AND |
|               o.Country3 = 'EG' AND o.City = 'Cairo'; |

In Query B, the predicates "c.Make='Mazda'" and "c.Model='323'" are correlated. When Query B is processed by a DBMS, the estimated selectivity of the "Make" predicate is 0.076 and the estimated selectivity of the "Model" predicate is 0.016. Based on an independence assumption, the selectivity of both predicates would be 0.076*0.016=0.00122. However, the correct selectivity of both predicates is actually the same as the selectivity of only the "Model" predicate, which is 0.016.

The difference between the estimate based on the independence assumption and the actual selectivity of both predicates is more than thirteen times in the example of Query B. This error can be avoided using monitored information. For example, had the "Car" table been accessed using a table scan such that the monitored selectivity included both predicates, the correlation would accordingly have been included in the monitoring. In this example, the estimated combined selectivity would have reflected the actual selectivity value of both predicates. If the access method comprises an index scan on the "Model" column, for example, then the optimizer may estimate the index selectivity, $S_{LPI}$, to be 0.016. When the local selectivity, $S_{LPR}$, is measured, the measured value would be "1," since the rows satisfying the "Model" predicate also satisfy the "Make" predicate. The final combined selectivity, $S_{ILP}*S_{LPI}$, would still be 0.016, which is the correct value.

For an inner table, the value of the join cardinality may be determined by monitoring the incoming rows and the outgoing rows. If the incoming row count is I and the outgoing row count is O, then the join cardinality of table T can be estimated by:

$$JC(T) = \frac{O(T)}{I(T)} \quad (10)$$

Figure 7:
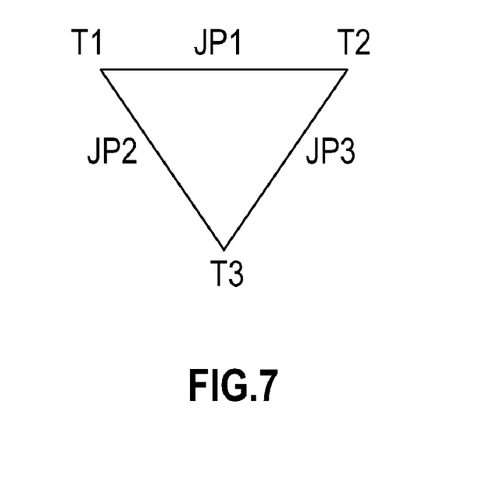
FIG. 7 is a diagrammatical illustration showing a join graph of three tables with three join predicates, in accordance with an embodiment of the present invention.
Figure 8:
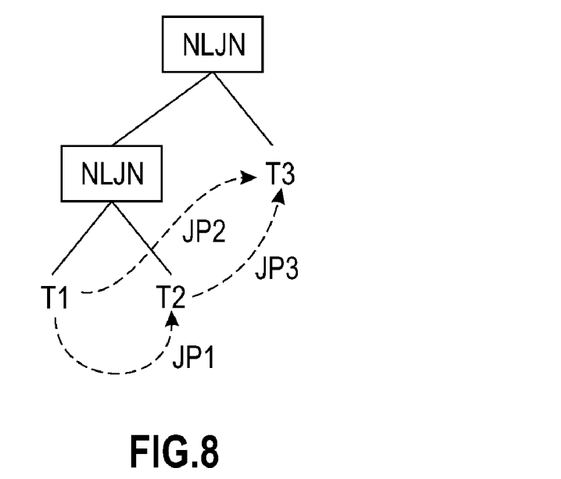
FIG. 8 is a diagrammatical illustration showing a query plan for the join graph of three tables of FIG. 7, in accordance with an embodiment of the present invention.
Figure 9:
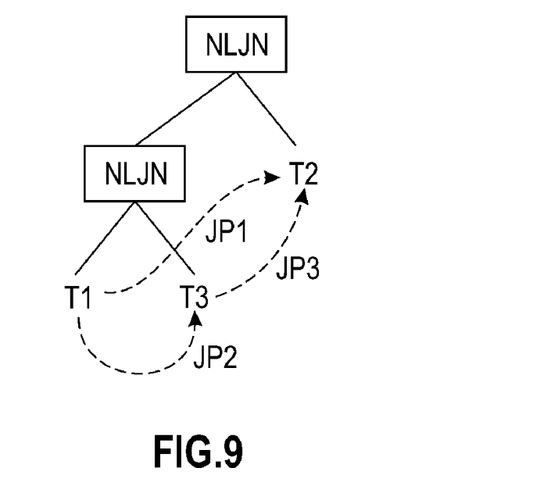
FIG. 9 is a diagrammatical illustration showing a reordered query plan for the join graph of the three tables of FIG. 7, in accordance with an embodiment of the present invention.

It should be understood that the available join predicates may change in the process of switching the join order of two inner tables. Consequently, the join cardinality may be adjusted accordingly. FIG. 7 is a join graph of three tables, $T_1$, $T_2$, and $T_3$, with three join predicates, $JP_1$, $JP_2$, and $JP_3$. When the join order is changed from the left query plan, shown in FIG. 8, to the right query plan, shown in FIG. 9, the join predicates on $T_2$ and $T_3$ will be changed. Accordingly, the new join cardinality of $T_3$ is adjusted to: $JC_{new}(T_3)=JC_{old}(T_3)/S_{JP3}$, while the new join cardinality of $T_2$ is adjusted to: $JC_{new}(T_2)=JC_{old}(T_2)*S_{JP3}$.

For a driving table, however, there is no join cardinality measurement. If the current driving table is to be positioned as an inner table, it becomes necessary to estimate the join cardinality for the old driving table by using the join selectivity of the join predicates between the old driving table and the old inner table. Suppose for example that the driving table is to be changed from $T_1$ to $T_2$ in the query plan of FIG. 8. In the original query plan, there is a join predicate, $JP_1$, between $T_1$ and $T_2$. Since the estimation of the table cardinality of $T_1$ is known, and the selectivity of the join predicate $JP_1$ is also known, the join cardinality of $T_1$ can be estimated by using the following expression:

$$JC(T_1) = S_{JP1} * C_{LEG}(T_1) \quad (11)$$

The above-disclosed methods of monitoring and estimations may be used to calculate the ranking metric of a join order, from which an optimal join order may be selected. Estimates may be made using the counts over the latest "w" incoming rows as incoming and outgoing rows are being monitored. At the same time, the simple average or the weighted average to combine history and current measurements may be selected. A parameter denoted by "w" representing a "history window" may be used to provide flexibility to the reordering process so as to adapt to data changes, while at the same time mitigating short-term fluctuations. Fluctuations may be monitored and window sizes may be adaptively adjusted during run-time.

It should be understood that, while the invention has been described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, magnetic tape, optical disks (e.g., CD-ROM' and DVD), among others, and transmission type media such as digital and analog communication links. Moreover, the foregoing relates to exemplary embodiments of the invention and that modifications may be made without departing from the spirit and scope of the invention as set forth in the following claims.

What is claimed is:

1. A method for executing a query, said method comprising the steps of:
    executing a portion of a predetermined query plan that includes querying a plurality of tables within a database on a computer, said predetermined query plan including at least one sequence of pipelined joins within the database on the computer;
    as the portion of the predetermined query plan executes, providing a reordered query plan for said sequence of pipelined joins based upon information derived from said executing the portion of the predetermined query plan;
    comparing a ranking metric of said portion of said predetermined query plan with a ranking metric of said reordered query plan; and
    upon either a driving table or an inner table within the plurality of tables having reached a depleted state during said executing the portion of the predetermined query plan, executing a portion of said reordered query plan that includes querying the plurality of tables within the database on the computer if said ranking metric of said reordered query plan is less than said ranking metric of said portion of said predetermined query plan.

2. The method as in claim 1 wherein said reordered query plan is produced by a step comprising one of the steps of: reordering two inner tables of said predetermined query plan, repositioning a driving table in said predetermined query plan as a new inner table, or repositioning an inner table in said predetermined query plan as a new driving table.

3. The method as in claim 1 wherein said step of executing said portion of said predetermined query plan comprises the step of executing said predetermined query plan until either a driving table or an inner table has reached a depleted state.

4. The method as in claim 3 wherein said depleted state comprises a state in which: (i) all matching rows in said inner table have been processed for a given outer row, or (ii) a next outer row has been requested from said driving table for said inner table, or (iii) a matching process has not begun for a next outer row for said inner table, or (iv) all said inner tables have completed processing incoming rows in said inner tables in said predetermined query plan or in said reordered query plan, or (v) said driving table has executed a procedure to prevent driving table rows already processed from being matched or being output in the future execution of said query plan.

5. The method as in claim 3 wherein said driving table comprises at least one of a cursor and a predicate used to maintain the status of a table access to avoid incorrect data duplication.

6. The method as in claim 5 wherein said table access comprises one of: a table scan or an index scan.

7. The method as in claim 1 wherein said ranking metric of said portion of said predetermined query plan comprises a function of at least one of: actual join cardinalities of tables having a query tree corresponding to said predetermined query plan, estimated join cardinalities of tables having a query tree corresponding to said predetermined query plan, actual execution cost for portions of said predetermined query plan, and estimated execution cost for portions of said predetermined query plan.

8. The method as in claim 1 wherein said step of comparing comprises the step of calculating an estimate of processing cost using the information derived in executing said predetermined query plan.

9. The method as in claim 8 wherein said processing cost comprises a ranking metric value defined by the expression:

$$RankingMetric(\text{Query Plan}(Q)) \equiv \sum_{i=1}^{k} \left[ PC(T_{o(i)}) \prod_{j=0}^{i-1} JC(T_{o(j)}) \right]$$

where $PC(T_{o(j)})$ is the cost of probing table $T_{o(j)}$ and $JC(T_{o(j)})$ is the join cardinality of table $To(j)$.

10. The method as in claim 1 further comprising the step of executing a second portion of said reordered query plan if said ranking metric of said reordered query plan is not less than said ranking metric of said predetermined query plan.

11. The method as in claim 1 wherein said step of executing said portion of said reordered query plan comprises the steps of dynamically modifying a join order of a corresponding pipelined join execution plan and executing said reordered query plan with a modified join order.

12. The method of claim 1, including executing a second portion of said predetermined query plan if said ranking metric of said reordered query plan is not less than said ranking metric of said portion of said predetermined query plan.

13. A method for adaptively modifying a pipelined query plan, said method comprising the steps of:
    executing a portion of the pipelined query plan that includes querying a plurality of tables within a database on a computer;
    monitoring execution of said portion of the pipelined query plan to obtain an estimated ranking metric of processing table rows; and
    implementing a query plan reordering to reduce said estimated ranking metric of processing said table rows;
    upon either a driving table or an inner table within the plurality of tables having reached a depleted state during said executing the portion of the pipelined query plan, executing a portion of said query plan that includes reordering; and
    excluding previously-accessed rows within the plurality of tables by adding a local predicate to a driving table within the plurality of tables if the driving table is changed during the executing the portion of said query plan reordering.

14. The method as in claim 13 wherein said step of implementing comprises the step of adaptively reordering query inner tables based on at least one of a function of: observed number of said table rows, estimated number of said table rows, observed cost of processing said table rows, and estimated cost of processing said table rows.

15. The method as in claim 14, where said step of adaptively reordering said inner tables includes the steps of calculating a processing rate for each said inner table and reordering said inner tables according to said processing rates.

16. The method as in claim 15, wherein said processing rate is computed by dividing a quantity of one less than an observed row cardinality value by the cost of processing said corresponding inner table row up to a first join.

17. An apparatus for executing a predetermined query plan having a sequence of pipelined joins, said apparatus comprising:
   a database storage device for storing data;
   a computer program product in a computer useable medium including a computer readable program, wherein the computer readable program when executed on the apparatus causes the apparatus to:
   execute a predefined portion of said predetermined query plan on said data;
   estimate a ranking metric for said predetermined query plan and a modified query plan that comprises setting an inner table as a driving table, based upon observed metrics including incoming and outgoing number of rows resulting from join predicates and local predicates as said predetermined query plan executes;
   as said predetermined query plan executes, adaptively modify said predetermined query plan to said modified query plan including setting the inner table as the driving table when said estimated ranking metric of executing said modified query plan is less than said estimated ranking metric of executing said predetermined query plan; and
   execute the modified query plan including setting the inner table as the driving table.

18. The apparatus as in claim 17 wherein said ranking metric of the query is a function of the cardinality value of the driving table and monitored join selectivities with inner tables.

19. The apparatus as in claim 17 wherein said reordered query plan comprises setting a table previously functioning as the driving table, as a new inner table.

20. The apparatus as in claim 17, wherein said reordered query plan is formed from the predetermined query plan by switching a driving table to an inner table and adding a local predicate based on at least one of a row scan position and a row value to said driving table.

* * * * *